United States Patent [19]

Biebl et al.

[11] Patent Number: 5,447,067
[45] Date of Patent: Sep. 5, 1995

[54] ACCELERATION SENSOR AND METHOD FOR MANUFACTURING SAME

[75] Inventors: Markus Biebl; Thomas Scheiter; Helmut Klose, all of Munich, Germany

[73] Assignee: Siemens Aktiengesellschaft, Munich, Germany

[21] Appl. No.: 207,080

[22] Filed: Mar. 8, 1994

[30] Foreign Application Priority Data

Mar. 30, 1993 [DE] Germany .................. 43 10 352.9

[51] Int. Cl.⁶ ............................................... G01P 1/02
[52] U.S. Cl. ................................................. 73/514.32
[58] Field of Search ............... 73/517 R, 517 B, 518, 73/493

[56] References Cited

U.S. PATENT DOCUMENTS

| | | | |
|---|---|---|---|
| 4,893,509 | 1/1990 | MacIver et al. | 73/517 AV |
| 5,025,346 | 6/1991 | Tang et al. | 73/517 AV |
| 5,233,873 | 8/1993 | Mozogowiec et al. | 73/493 |
| 5,357,803 | 10/1994 | Lane | 73/517 B |

FOREIGN PATENT DOCUMENTS 4017265 12/1991 Germany .
4022464 1/1992 Germany .

OTHER PUBLICATIONS

"Silicon Micromechanics: Sensors and Actuators on a Chip", Howe et al. IEEE Spectrum, Jul. 1990, pp. 29–35.

*Primary Examiner*—Hezron E. Williams
*Assistant Examiner*—Max H. Noori
*Attorney, Agent, or Firm*—Hill, Steadman & Simpson

[57] ABSTRACT

An acceleration sensor has a proof mass attached by resilient elements, in the form of micromechanical components, in a monocrystalline silicon layer of an SOI (silicon-on-insulator) substrate, the insulator layer of the substrate being removed under the structure which is susceptible to acceleration, in order to enable free mobility of the micromechanical components. Piezoresistors are provided for detecting movement of the proof mass, the piezoresistors supplying electrical signals to an evaluation circuit.

7 Claims, 2 Drawing Sheets

ACCELERATION SENSOR AND METHOD FOR MANUFACTURING SAME

BACKGROUND OF THE INVENTION

1. Field of the Invention

The present invention is directed to an acceleration sensor, and in particular to an acceleration sensor constructed on an SOI (silicon-on-insulator) substrate, for exact measurement of minute accelerations, as well as to a method for manufacturing such an acceleration sensor.

2. Description of the Prior Art

Modern navigation systems as well as safety systems in the automotive field require reliable acceleration sensors which are small and simple to manufacture, and which have a high measuring precision and a good proportionality between the measured quantity and the corresponding output signal. Conventionally manufactured acceleration sensors, by contrast, are relatively large, expensive and imprecise. In response to these deficiencies, various forms of micromechanical acceleration sensors have been devised as described, for example, in the article "Silicon Micromechanics: Sensors and Actuators on a Chip," Howe et al., IEEE Spectrum, July 1990, pages 29-35. In such known micromechanical acceleration sensors, however, polysilicon layers are used for the manufacture of the mechanically moving parts. As a consequence, the mechanical long-term stability of these parts is inadequate under certain circumstances in comparison to the expected service life of the systems in which they are utilized. In addition to the possible degradation over time, the mechanical properties of such parts, such as the modulus of elasticity and the intrinsic stress of the layers, are sensitively dependent on the particular manufacturing conditions. The thermal curing of the intrinsic stress of the layers, for example, requires additional temperature steps in the manufacturing process, which have a disadvantageous effect on the simultaneously manufactured electronics which are integrated in the sensor. Moreover, long-lasting and complicated depositions of semiconductor layers are necessary.

SUMMARY OF THE INVENTION

It is an object of the present invention to provide a simply manufacturable acceleration sensor which is capable of making reliable measurements with high precision in the sub-microgravity range (i.e., $10^{-6}$ of the acceleration due to gravity), and which has a high long-term mechanical stability.

It is a further object of the present invention to specify a method for manufacturing such an acceleration sensor.

The above objects are achieved in accordance with the principles of the present invention in an acceleration sensor having a proof mass attached to one or more resilient spring elements, the proof mass and the resilient elements being formed in a monocrystalline silicon layer of a SOI substrate, with the insulator layer of the substrate being removed in a region which is sufficiently large to permit free mobility of the proof mass. Means are provided for determining the excursion (amount of displacement) of the proof mass due to acceleration from a quiescent position.

The acceleration sensor of the invention avoids the disadvantages associated with the use of polysilicon layers for the mechanically movable parts, by instead using single-crystal silicon for these parts. Monocrystalline silicon has precisely known mechanical properties, which are not dependent on the particular parameters of the manufacturing process used to make the parts. Moreover, the mechanical properties are not subject to chronological degradation, so that the long-term stability is better. The use of SOI substrates is particularly advantageous, because in such substrates, the monocrystalline silicon layer is located on the insulator layer. The main constituent of these substrates can be a monocrystalline silicon body, so that two monocrystalline silicon layers are separated by an intervening insulator layer. In the acceleration sensor of the invention using an SOI substrate, the mechanically moving parts are fashioned in the silicon layer, on the insulator layer, and the insulator layer is removed beneath the structured region of the silicon layer in order to enable the free mobility of the micromechanical parts.

DESCRIPTION OF THE PREFERRED EMBODIMENTS

Figure 1:
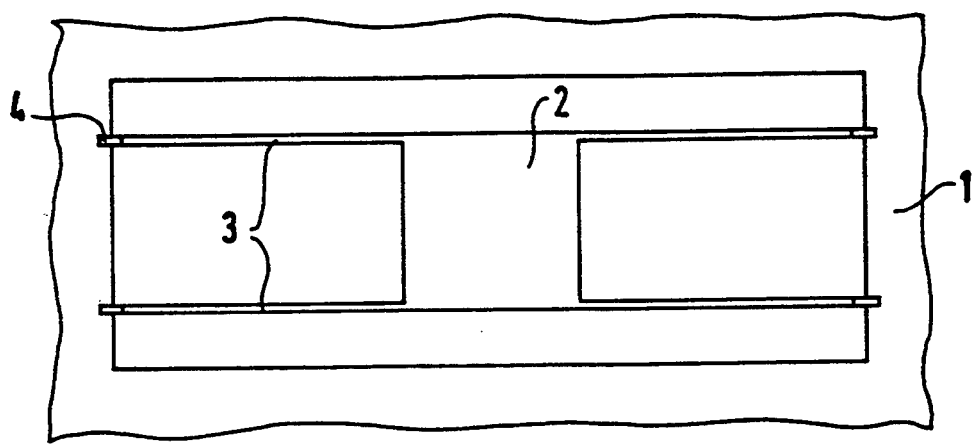
FIG. 1 is a plan view of a first embodiment of an acceleration sensor constructed in accordance with the principles of the present invention, in the form of a piezoresistive acceleration sensor.

FIG. 1 shows the structure of a piezoresistive acceleration sensor on an SOI substrate in a plan view. The structure of the mechanical parts is etched out of the upper, monocrystalline silicon layer 1 of the substrate. A proof mass 2 is suspended by one or more resilient elements 3, and is connected via the resilient elements 3 to the remaining portion of the silicon layer 1. Piezoresistors 4, which change their electrical resistance dependent on a mechanical deformation thereof, are disposed at the location at which the resilient elements 3 are secured to the silicon layer 1. The silicon layer 1 is sufficiently doped so as to be electrically conductive, so that a change in the resistance of the piezoresistors 4 can be identified. The piezoresistors 4 can be attached at arbitrary locations of the resilient elements 3, as long as they are disposed at a location which is subject to mechanical deformation as a result of the acceleration to which the sensor is subjected.

It is preferable to attach the piezoresistors 4 at locations at which the material of the silicon layer 1 is particularly highly deformed given a movement of the proof mass 2. In order to permit the proof mass 2 to be able to move relative to the substrate, due to its inertia in the presence of an acceleration of the substrate, the insulator layer is removed beneath the proof mass 2 and beneath the resilient elements 3 in a region sufficiently large to permit mobility of the proof mass 2. The proof mass 2 can be provided with holes in order to facilitate the removal of this insulator layer during manufacture. If the width of the resilient elements 3, i.e., their lateral dimension in the plan view shown in FIG. 1, is small in comparison to their thickness, the axis of the principal sensitivity of the sensor will lie in the plane of the silicon layer 1. If, conversely, the width of the resilient elements 3 is large in comparison to their thickness, the axis of the principal sensitivity of the sensor will be perpendicular to the silicon layer 1. In FIG. 1, the direction of an acceleration to be detected is perpendicular to the longitudinal direction of the resilient elements 3.

Figure 2:
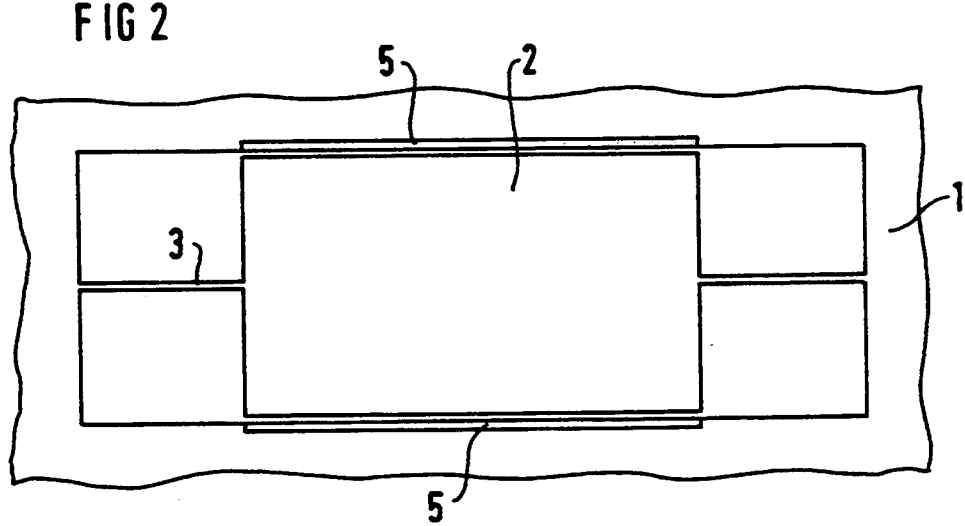
FIG. 2 is a plan view of a second embodiment of an acceleration sensor constructed in accordance with the principles of the present invention in the form of a capacitive acceleration sensor.

FIG. 2 shows the structure of an acceleration sensor in plan view wherein a capacitive measurement of the acceleration is undertaken. The micromechanical elements are again etched out of the upper, single-crystal silicon layer 1 of the substrate. As in the preceding exemplary embodiment, the proof mass 2 is connected to the remaining portion of the silicon layer 1 by means of resilient elements 3. The proof mass 2 is doped so as to be electrically conductive, and forms a capacitor in combination with corresponding, doped regions in the silicon layer 1, which are disposed opposite the proof mass 2, and form the cooperating electrodes 5. The proof mass 2 thus forms a separate capacitor with each of the electrodes 5. These capacitors are arranged so that the respective capacitances thereof change as a consequence of the modified spacing of the conductors which occurs given a movement of the proof mass 2 perpendicular to the longitudinal direction of the resilient elements 3. This change in the capacitances ensues oppositely at the respective capacitors disposed at the opposite sides of the proof mass 2. The acceleration can therefore be directly identified from the difference between the respective capacitance changes of the two capacitors. Moreover, the force acting perpendicularly relative to the longitudinal direction of the resilient elements 3 due to an acceleration in the plane of the silicon layer 1 can be compensated by applying an appropriate polarization voltage to the doped electrodes of the capacitors. As a result, the measured signal is highly linearized, and the range of measurement is expanded, the resilient constant of the suspension of the proof mass 2 formed by the resilient elements 3 being negligible in a first approximation. This structure is suitable for detecting accelerations in the plane of the silicon layer 1 perpendicular to the longitudinal direction of the resilient elements 3.

Figure 3:
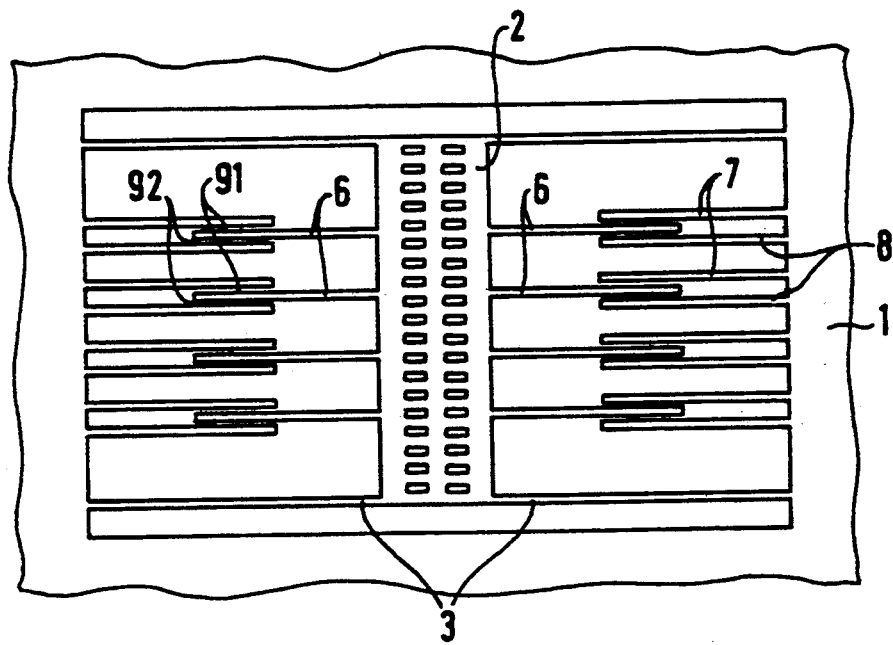
FIG. 3 is a plan view of a third embodiment of an acceleration sensor constructed in accordance with the principles of the present invention, also in the form of a capacitive acceleration sensor.

FIG. 3 shows a further version of a capacitively measuring acceleration sensor in plan view wherein the capacitors are formed by finger-shaped electrodes. The proof mass 2 is connected to the remaining portion of the silicon layer 1 by resilient elements 3. The proof mass 2 is shown in FIG. 3 with holes therein, which make the insulator layer beneath the proof mass 2 more easily accessible for being etched away during manufacture.

Finger-shaped electrodes 6, which are doped so as to be electrically conductive, are located at the proof mass 2. The electrodes 6 form a plurality of capacitors together with corresponding, finger-shaped electrodes 7 and 8, respectively disposed on opposite sides of each electrode 6 and connected to the remaining silicon layer 1. An acceleration of the proof mass 2 in the plane of the silicon layer 1, perpendicular to the resilient elements 3, causes a change in capacitance between one of the finger-shaped electrodes 6 of the proof mass 2 and one of the electrodes 7 and 8 of the silicon layer 1 arranged next to the electrode 6. The electrodes 7 on each side of the proof mass 2 are all electrically connected together, so as to form a group of capacitors 91 in combination with the electrodes 6. Similarly, all of the electrodes 8 on each side of the proof mass 2 are electrically connected together, thereby forming a second set of capacitors 92 in combination with the electrodes 6. The capacitors 91, therefore, all change their capacitance in the same direction given a movement of the proof mass 2, and the capacitors 92 all change their capacitance in common in an opposite direction. The acceleration can thus be identified from the difference between the total capacitances of these two sets of capacitors. By applying an appropriate polarization voltage, the inertial force which arises as a consequence of the acceleration of the substrate can be compensated, so that the proof mass 2 is not moved relative to the substrate. As a result, the measured signal is extremely highly linearized, and the range of measurement is expanded, and a possible change in the spring constant of the spring elements 3, given larger excursions, need not be taken into consideration in the calculation which takes place in an evaluation circuit (not shown) connected to each of the capacitors. This structure is suitable for detecting accelerations in the plane of the silicon layer 1 perpendicular to the longitudinal direction of the resilient elements 3.

Figure 4:
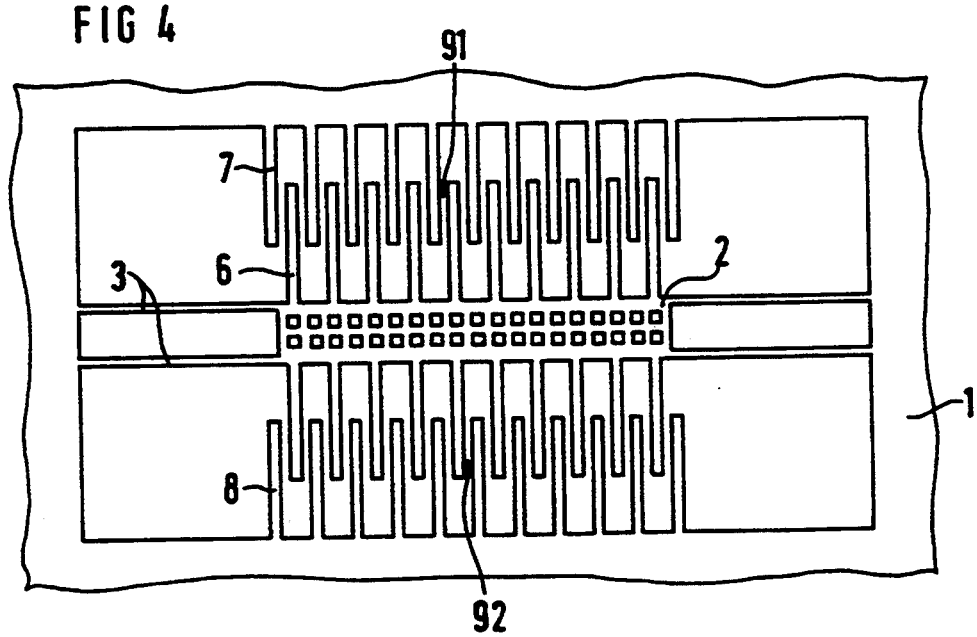
FIG. 4 is a plan view of a fourth embodiment of an acceleration sensor constructed in accordance with the principles of the present invention, also in the form of a capacitive acceleration sensor.

FIG. 4 shows a further version of an acceleration sensor wherein a capacitative measurement of acceleration is undertaken, wherein the excursion of the proof mass 2 ensues in the longitudinal direction of the finger-shaped electrodes. An acceleration of the substrate perpendicular to the longitudinal direction of the resilient elements 3, holding the proof mass 2, is also detected in the embodiment of FIG. 4. In this embodiment, the finger-shaped electrodes 6 applied to the proof mass 2 are arranged so that their longitudinal directions extend perpendicularly to the longitudinal direction of the resilient elements 3. The finger-shaped electrodes 7 and 8, which are connected to the remaining silicon layer 1, form the cooperating electrodes with the electrodes 6, and all of the electrodes 7 are connected to each other at each side of the proof mass 2, and all of the electrodes 8 are electrically connected to each other at each side of the proof mass 2. Interdigital capacitors 91 and 92 are thus formed at each side of the proof mass 2. These two capacitors 91 and 92 respectively change their capacitance in opposite directions given an acceleration of the substrate, and thus an excursion of the proof mass 2 in the plane of the silicon layer 1 perpendicular to the longitudinal direction of the resilient elements 3. The acceleration can be directly identified from the difference between the capacitance changes of the two capacitors 91 and 92. By applying an appropriate polarization voltage, moreover, the force of inertia acting due to the acceleration can be compensated, so that the proof mass 2 is not deflected. The linearization of the measured signal and the aforementioned advantages of the previous embodiments are also present in the embodiment of FIG. 4.

Each of the above embodiments, regardless of the individual structure thereof, includes a proof mass which is suspended by one or more resilient elements, with the proof mass and the springs being fashioned in the silicon layer of an SOI substrate. The ratio of the width-to-thickness of the spring elements defines the direction of the sensitivity of the acceleration sensor (perpendicular to the longitudinal direction of the spring elements). A measurement of the inertial force acting on the proof mass 2 as a consequence of an acceleration of the substrate can be undertaken substantially more precisely in the embodiments wherein the measurement is made capacitively, as opposed to the embodiment employing a piezoresistor. Such a capacitively measuring acceleration sensor is less dependent on temperature. Moreover, such capacitively measuring sensors can be more easily manufactured in large quantity given low tolerances. Making use of a capacitive measurement also has the advantage that the inertial forces which arise can be compensated by electrostatic forces, by applying appropriate potentials to the electrodes of the capacitors. It is theoretically possible also to measure accelerations capacitively arising perpendicularly to the plane of the silicon layer, with an appropriate embodiment of the acceleration sensor of the invention. In such an embodiment, however, a cooperating electrode above the plane of the proof mass 2 would then be required, in addition to a substrate electrode, so that the differences in the capacitance changes occurring above and below the proof mass 2 could be measured. This cooperating electrode, which simplifies the measurement, may be formed, for example, by a further layer produced by applying a polysilicon layer onto the SOI substrate.

The sensor of the invention is manufactured by electrically doping an SOI substrate so as to render the substrate conductive, at least in the regions required for the electrical conductors for the piezoresistors, or for the capacitors and their terminals. The silicon layer is then structured, for example, using a lithographic process (for example, electron beam lithography). The micromechanical parts are formed in the silicon layer by removing portions of the silicon layer in an etching process (for example, anisotropic dry etching). The material of the insulator layer (for example, $SiO_2$) situated beneath the manufactured structure is removed with a further etching process (for example, wet chemical etching). In order to avoid adhesion problems which may arise in wet chemical etching, sublimating chemicals (for example, cyclohexane or dichlorobenzene) can be used. Given simultaneous production of the sensor and an electronic evaluation circuit integrated in a common SOI substrate, the electronic circuit is first produced up to the metallization stage. The parts of the substrate which do not belong to the sensor are covered with a protective layer, for example, photoresist, and the micromechanical elements are then produced and the protective layer is subsequently removed.

In the acceleration sensor of the invention, the deposition of an additional layer is eliminated in the manufacturing process, thereby simplifying the manufacturing process. Moreover, no tempering for curing the intrinsic stress of the mechanical components is required. Electronic components integrated in the substrate are therefore not influenced at all, in terms of their electrical properties, by the manufacture of the sensor part. The most modern manufacturing processes for generating small structural sizes can therefore be utilized for the electronic elements. Sensors with integrated electronics can therefore be manufactured with extremely small dimensions. The overall manufacturing process is thereby further simplified. An arrangement of a plurality of sensors as disclosed herein in a sensor array, for detecting acceleration in three orthogonal spatial directions, is possible in a simple manner. High precision, even for detecting minutes accelerations, with high long-term stability, are ensured.

Although modifications and changes may be suggested by those skilled in the art, it is the intention of the inventors to embody within the patent warranted hereon all changes and modifications as reasonably and properly come within the scope of their contribution to the art.

What is claimed is:

1. An acceleration sensor comprising:
   a silicon-on-insulator substrate having a monocrystalline silicon layer and an insulator layer;
   a proof mass consisting of silicon doped so as to be electrically conductive and at least one resilient element formed in said silicon layer, said at least one resilient element extending between and electrically connecting said proof mass and a remainder of said silicon layer;
   said insulator layer having an opening therein in which said proof mass and said at least one resilient element are disposed, said proof mass and said at least one resilient element being freely movable within said opening; and
   said substrate having a plurality of regions disposed opposite said proof mass which are doped so as to be electrically conductive, said proof mass and said regions of said substrate forming, in combination, a plurality of capacitors with each capacitor having a first electrode and a second electrode, said proof mass forming each first electrode and said regions of said substrate respectively forming the second electrodes, said capacitors comprising means for generating an electrical signal corresponding to movement of said proof mass from a quiescent position due to inertial forces acting on said proof mass resulting from acceleration of said substrate for determining the magnitude of said acceleration.

2. An acceleration sensor comprising:
   a silicon-on-insulator substrate having a monocrystalline silicon layer and an insulator layer;
   a proof mass consisting Of silicon doped so as to be electrically conductive and at least one resilient element formed in said silicon layer, said at least one resilient element extending between and electrically connecting said proof mass and a remainder of said silicon layer;
   said insulator layer having an opening therein in which said proof mass and said at least one resilient element are disposed, said proof mass and said at least one resilient element being freely movable within said opening, said silicon layer being disposed in a plane and said acceleration mass being movable in said plane of said silicon layer; and
   said substrate having a plurality of regions disposed opposite said proof mass which are doped so as to be electrically conductive, said proof mass and said regions of said substrate forming, in combination, a plurality of capacitors, each capacitor having first and second electrodes, said first electrodes comprising a plurality of finger-shaped electrodes extending from said proof mass and said second electrodes comprising a plurality of cooperating finger-shaped electrodes extending from said remainder of said silicon layer, said plurality of capacitors comprising means for generating an electrical signal corresponding to movement of said proof mass from a quiescent position due to internal forces acting on said proof mass resulting from acceleration of said substrate for determining the magnitude of said acceleration.

3. An acceleration sensor as claimed in claim 2 wherein said electrodes extending from said proof mass are disposed at opposite sides of said proof mass and wherein said electrodes of said proof mass have a longitudinal direction, wherein said cooperating finger-shaped electrodes are disposed at said remainder of said silicon layer at said opposite sides of said proof mass, and wherein said at least one resilient element is disposed for permitting movement of said proof mass in said opening of said insulator layer along said longitudinal direction of said electrodes.

4. An acceleration sensor as claimed in claim 2 wherein said finger-shaped electrodes of said proof mass are disposed at opposite sides of said proof mass and wherein said electrodes of said proof mass have a longitudinal direction, wherein said at least one resilient element is arranged to permit movement of said proof mass in a direction perpendicular to said longitudinal direction, wherein said silicon layer is disposed in a plane, and wherein said finger-shaped electrodes at said silicon layer are disposed on opposite sides of said proof mass and are disposed relative to said electrodes of said proof mass to form respective capacitors in a direction perpendicular to the longitudinal direction of said electrodes of said proof mass.

5. A method for manufacturing an acceleration sensor comprising the steps of:

providing a silicon-on-insulator substrate having a monocrystalline silicon layer and an insulating layer;

forming a structure including a proof mass and at least one resilient element in said silicon layer of said SOI substrate, said at least one resilient element extending between said proof mass and a remainder of said silicon layer;

removing a region of said insulator layer beneath said proof mass and said at least one resilient element to permit free mobility of said proof mass and said at least one resilient element in said region from a quiescent position due to a force of inertia acting on said proof mass resulting from acceleration of said substrate; and forming a plurality of capacitors each having a first capacitor electrode movable with said proof mass and a second capacitor electrode attached to said remainder of said silicon layer.

6. A method as claimed in claim 5 wherein the step of forming said plurality of capacitors is further defined by forming a plurality of interdigital capacitors.

7. A method as claimed in claim 5 wherein the step of forming a structure in said silicon layer is further defined by forming a microstructure in said silicon layer including said proof mass and said at least one resilient element.

* * * * *